Feb. 3, 1970

M. KRUEGER 3,492,681

AUTOMATIC MACHINERY

Filed July 7, 1967

Inventor
Max Krueger
By his Attorney

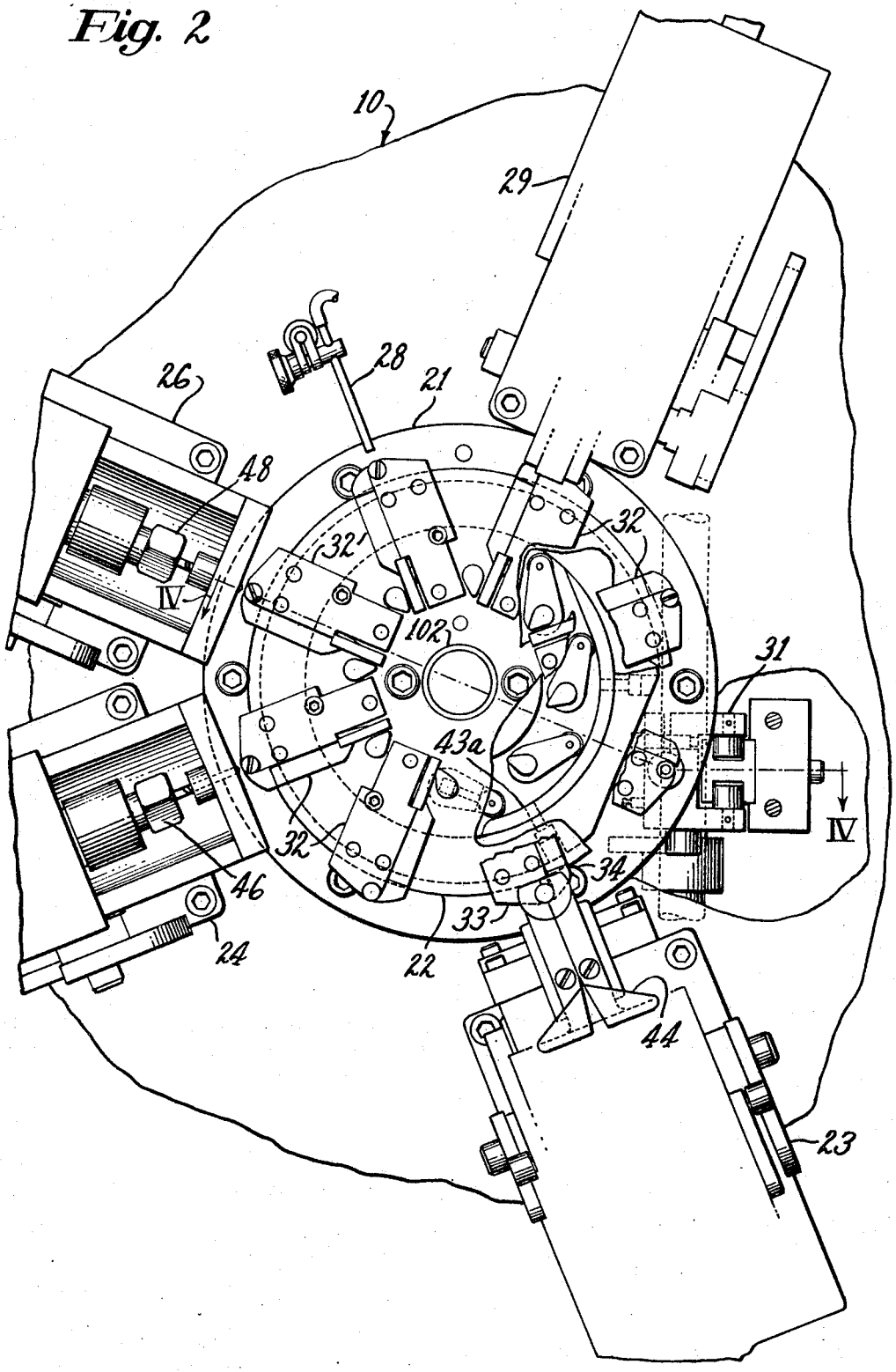

Feb. 3, 1970  M. KRUEGER  3,492,681
AUTOMATIC MACHINERY
Filed July 7, 1967  8 Sheets-Sheet 3
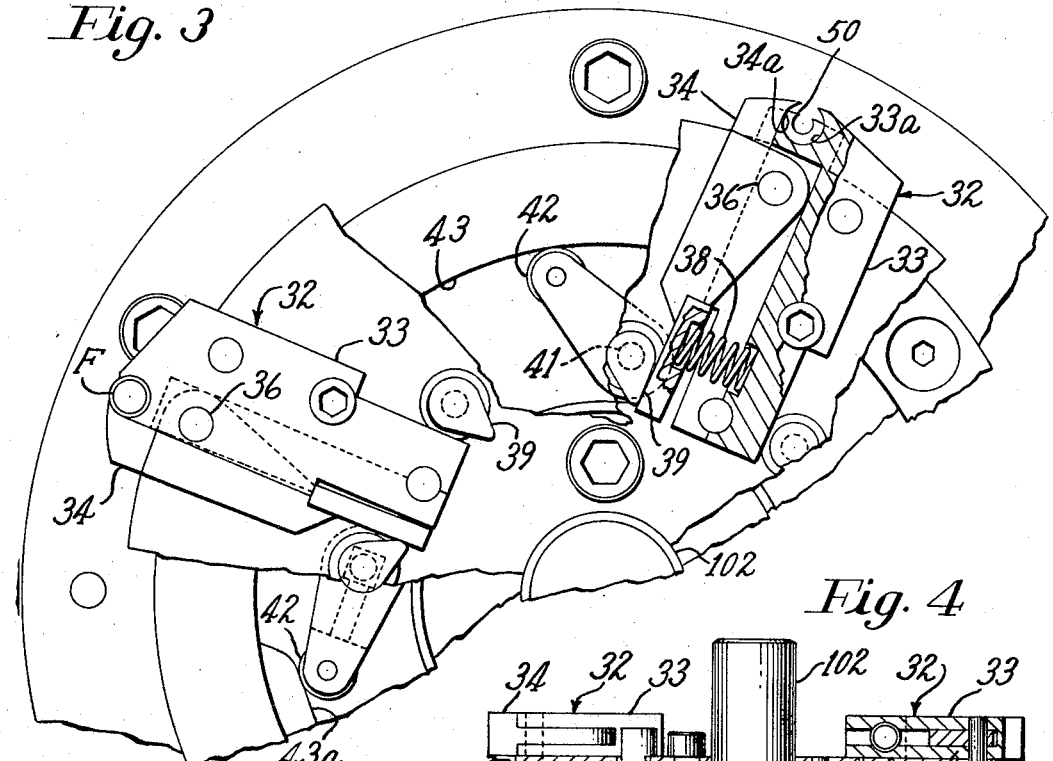
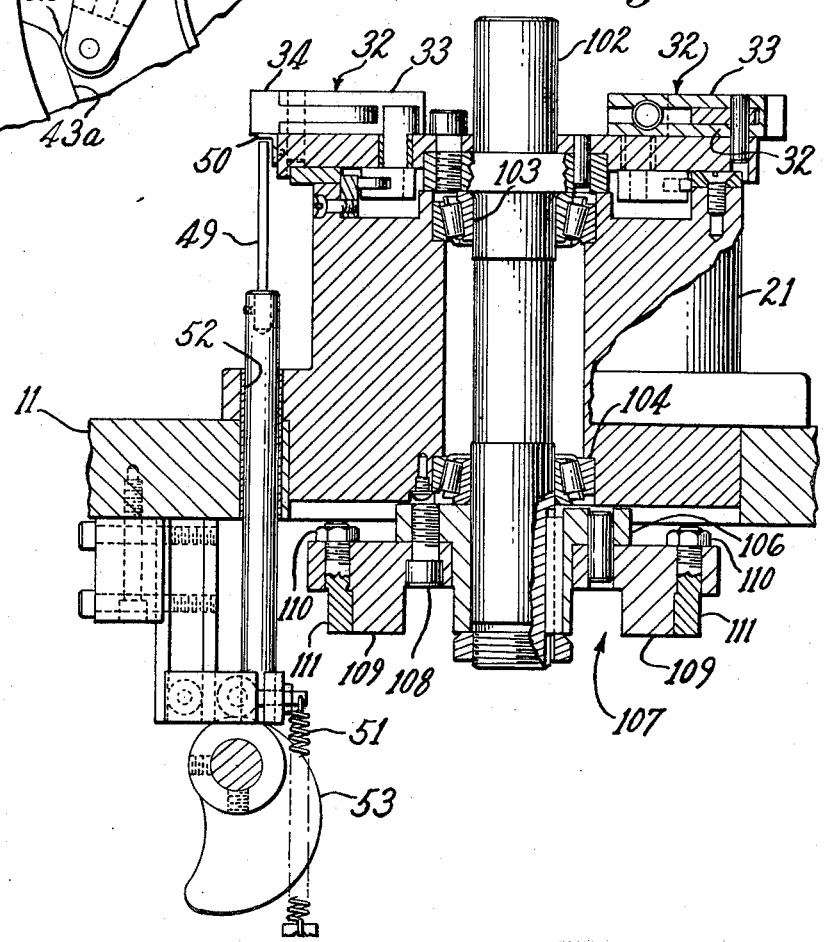

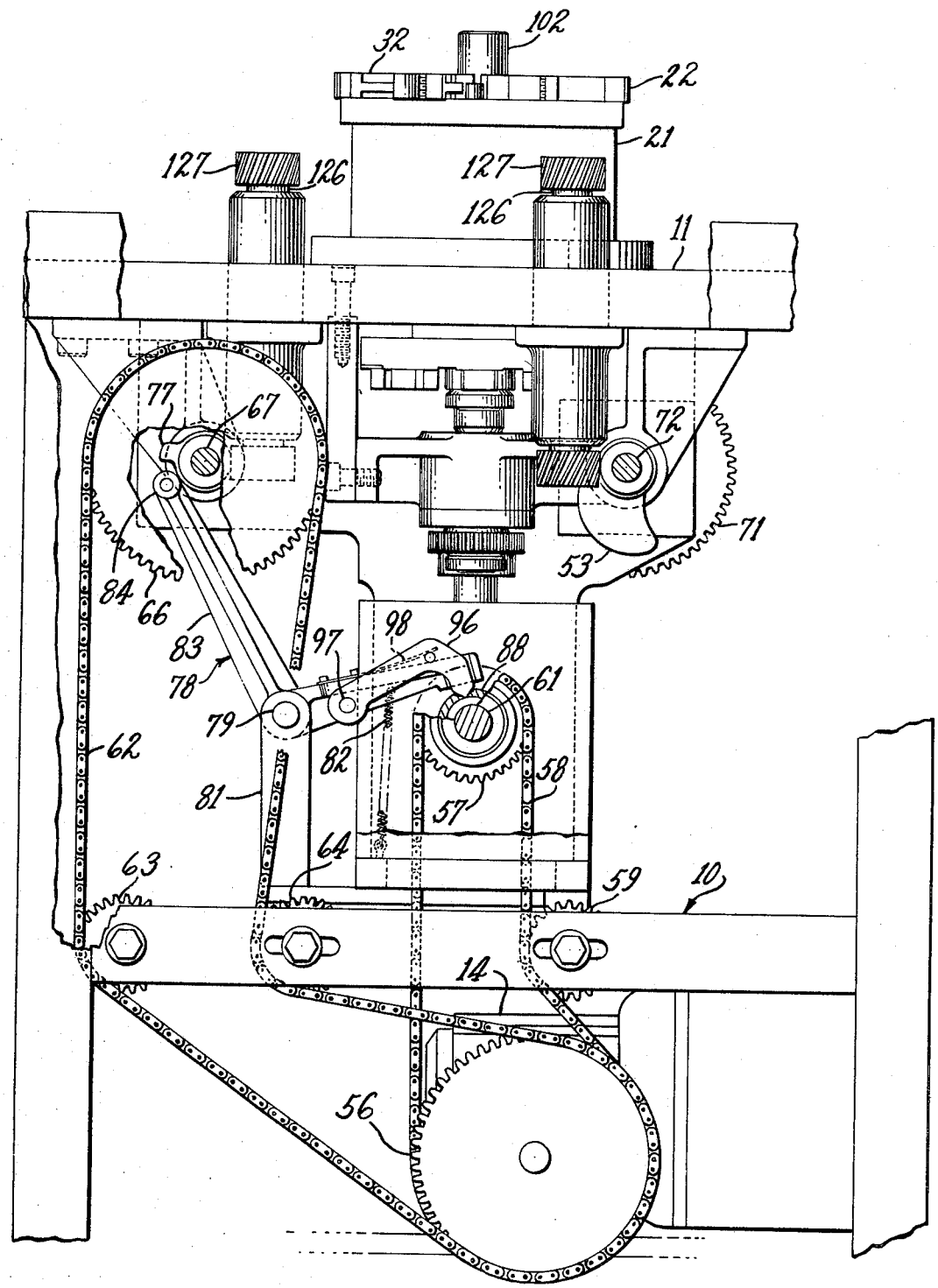

Feb. 3, 1970   M. KRUEGER   3,492,681
AUTOMATIC MACHINERY
Filed July 7, 1967   8 Sheets-Sheet 5

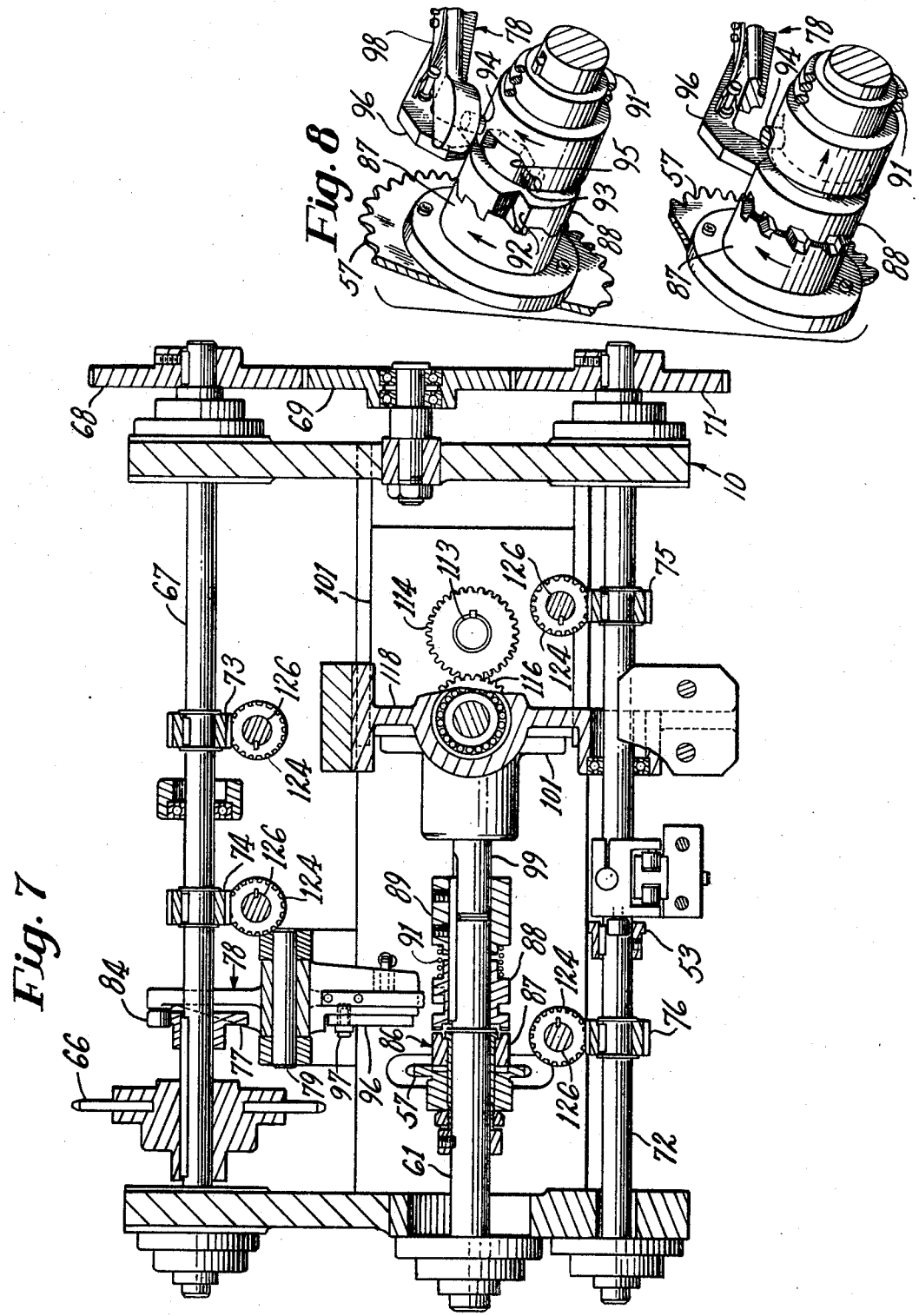

Feb. 3, 1970    M. KRUEGER    3,492,681
AUTOMATIC MACHINERY

Filed July 7, 1967    8 Sheets-Sheet 7

United States Patent Office 3,492,681
Patented Feb. 3, 1970

3,492,681
AUTOMATIC MACHINERY
Max Krueger, Rochelle Park, N.J., assignor to Space Research Corporation, Elmira, N.Y., a corporation of New York
Filed July 7, 1967, Ser. No. 651,773
Int. Cl. B23b 39/20; B23g 9/00
U.S. Cl. 10—11                            14 Claims

ABSTRACT OF THE DISCLOSURE

A machine for automatically performing secondary operations such as drilling, milling, staking and/or assembly on components such as fasteners having inserts of friction material for locking purposes comprising an indexing dial mounted for movement relative to a stationary turret, and having a plurality of clamping jaws for receiving fasteners to be operated upon. The dial is rotated such that the fasteners which are received on the dial at one station are in turn passed through a plurality of stations mounted on the turret, where work heads are activated to perform specific operations on each fastener, the fastener being ejected from the dial at the last of said stations.

BACKGROUND OF THE INVENTION

The present invention relates to improvements in automatic machinery for performing a plurality of operations on a workpiece and more particularly to apparatus for making self-locking threaded fastener devices such as screws, bolts and the like.

Heretofore, apparatus has been provided in various forms wherein fastener elements such as screws and bolts are automatically worked upon to provide self-locking threaded fasteners having strips or pellets of friction material introduced onto the threaded portion. In particular, such devices have been disclosed in the Borner United States Letters Patent No. 2,779,039, dated Jan. 29, 1957 and more recently in the Brightman United States Letters Patent No. 3,185,468, issued May 25, 1965. Each of these patents provides means for introducing threaded fastener devices one after another into retaining elements wherein they are moved by a turret and dial means to positions where drilling, milling, and other work functions are performed.

One of the problems, which is encountered in the performance of secondary operations on such devices, is that of maintaining the location of the fastener being operated on relative to the work performing station. The need for accurate location of the workpiece increases as the workpiece decreases in size. In the prior art devices the fastener element has generally been maintained in precise location circumferentially with respect to the dial member by employing a retractable plunger, sometimes called a shot pin, which is engageable and disengageable in a bushed recess of the indexing dial as the fastener is moved to each succesive operating station. The milling and drilling operation is generally produced by hydraulic or pneumatic means wherein movement of the drill or milling head relative to the fastener is controlled by piston travel.

The use of pneumatic or hydraulic means for performing these functions has, however, been found to be unsatisfactory in situations where the size of a fastener being operated upon, varies from one batch to another as the adjustment of piston travel or relocation of the hydraulic or pneumatic work head is difficult and time consuming. Additionally, many of the known hydraulically actuated machines for use in performing secondary operations on self-locking fasteners have not proven to be adaptable for use on miniature fasteners of $1/64$ inch diameter or less, and are relatively slow in operation.

The present invention, therefore, has as an object to provide automatic machinery of the turret and dial type for manufacturing self-locking fasteners or the like wherein the circumferential location of the fastener element is held in precise alignment with the working head solely by means of the dial rotating mechanism.

A further object of the invention is to provide a machine for manufacturing self-locking fasteners wherein the working heads are operated by mechanical means.

Yet another object of the invention is to provide a machine for fabricating self-locking fasteners which is easily modified to accept fasteners of varying sizes.

A more general object of the present invention is to provide automatic machinery for performing a plurality of operations on a workpiece wherein the work heads are readily movable about the workpiece for changing the sequence of operations.

Still another general object of the invention is to provide automatic machinery for performing a plurality of operations on a workpiece wherein a single work head is adaptable to perform a plurality of operations.

A further general object of the invention is to provide automatic machinery of the turret dial type for performing a plurality of operations on a workpiece wherein the work heads and dial are relatively free from damage caused by jamming of the dial or heads.

SUMMARY

To achieve the various objects, the present invention provides an automatic machine having a table with a plurality of openings for insertion therethrough of the post portion of a work head. A plurality of driven gears are located adjacent each of the openings and in meshing engagement with a gear mounted on the post of a work head, such that a work head is operative when mounted adjacent any of the openings on the work table.

The table is generally provided with dial means for providing intermittent motion to a workpiece to be operated on by the work heads. By mechanically interconnecting the dial means and the driving gears to a common drive means as provided in the present invention, should either the dial means or a work head become jammed during operation of the apparatus, upon release, the indexing of the dial will continue with the work heads in precise alignment with a workpiece as before the jamming occurred.

Additionally, the present invention provides mechanical means for providing intermittent motion to the dial means including a pair of roller elements which are employed as a driving element for the dial. The dial is provided in turn with a plurality of driven elements which are so constructed that precise location of the dial is achieved, which is not effected by movement of the driving element through a substantial degree of rotation. Thus, the dial is moved by, and held in place by a driving element (which may have substantial back-lash) without the aid of an external pin or other locating means.

BRIEF DESCRIPTION OF THE DRAWINGS

For a better understanding of the present invention reference should be had to the accompanying drawings, wherein:

FIG. 2 is a horizontal top plan view taken on an enlarged scale showing details of the upper portion of the machine shown in FIG. 1;

FIG. 3 is a fragmentary top plan view showing portions of the structure of FIG. 2 taken on a greatly enlarged scale for clarity;

FIG. 4 is a sectional elevational view taken along the lines IV—IV of FIG. 2, showing details of the structure;

FIG. 5 is a rear elevational view, partially in section, showing portions of the drive mechanism of the machine;

FIG. 7 is a sectional bottom plan view taken along lines VII—VII of FIG. 6 further showing portions of the drive mechanism in detail;

FIG. 8 is a fragmentary perspective view partially in section showing details of the clutch mechanism of the machine, taken on an enlarged scale for clarity;

DESCRIPTION OF THE PREFERRED EMBODIMENT

Figure 1:
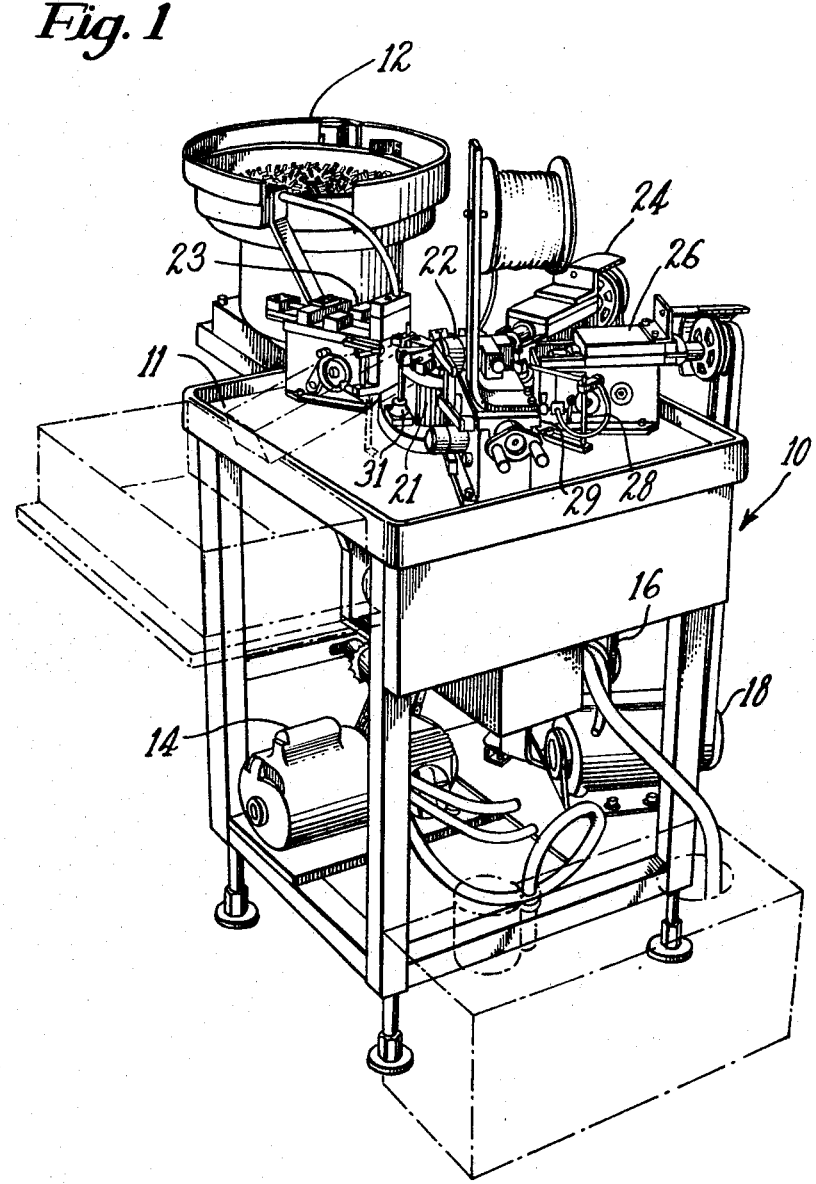
FIG. 1 is a perspective view showing an automatic machine for the manufacture and assembly of self-locking threaded fasteners, which machine is constructed in accordance with the teachings of the present invention.

Referring now to the drawings and in particular FIG. 1, there is shown a machine embodying the present invention which includes a frame 10 supporting a table 11 on which is mounted a feeder hopper 12 for introducing screws or other threaded fasteners to the machine. The hopper 12 as shown is of the vibratory type well known in the art. However, any other suitable means may be used to automatically feed the fasteners to the present machine. Mounted at the lower portion of the frame 10 is a main drive motor 14 and a pair of auxiliary drive motors 16 and 18 which are employed to power the tools used in the fabricating process.

The frame 10 also has a stationary turret 21 mounted on a top surface of the table 11, and a dial member 22 for rotation relative to the stationary turret. The turret 21 has mounted about its periphery in clockwise order a feeder station 23, a first drill station 24, a second drill station 26, a blow out station 28, a pellet insertion station 29 and an ejection station 31.

For a clear understanding of the operation of the elements disposed above the frame 10 reference should now be had to FIGS. 2 and 3 taken in conjunction with FIG. 1. A plurality of clamping members 32 are mounted about the periphery of the dial member 22 and are spaced equidistant one from another. As shown in detail in FIG. 3, each clamping member comprises a fixed jaw 33 having an arcuate clamping surface 33a and a movable jaw 34 having an arcuate clamping surface 34a. The jaw 34 is mounted for pivotal movement on a pin 36, and is biased in a first direction by a spring 38 and moved against the spring by a finger 39. The finger 39 is pivotally movable about a pin 41 by radial movement of a cam follower 42 riding along a cam surface 43.

As will be noted in FIG. 3, when the cam follower 42 is disposed on a high rise portion 43a of the cam surface 43 the finger 39 urges the jaw 34 towards the jaw 33 causing the clamping surfaces 34a and 33a to move outwardly, relative one to the other, to release a fastener F or to accept a fastener therebetween. When the cam follower 42 drops to the low cam surface 43 the finger 39 moves to permit the jaw 34 to be biased away from the jaw 33 by the spring 38, producing a clamping action between the surfaces 34a and 36a to thereby hold the fastener in position to be worked upon.

In FIG. 2 it will be noted that the high rise portion 43a is removably fastened to a circular cut-out in the turret 21 which forms the low rise cam surface 43. The high rise surface 43a can be moved to any position about the turret 21 to accommodate opening and closing of the jaws 32 at a desirable location, or may be exchanged for a different shaped surface to maintain the jaws in the open or closed position for a different dwell time.

In FIG. 2 it should be noted that the feeder station 23 is provided with a pair of jaws 44 which are effective to receive a fastener from the hopper 12 and deposit it into the open jaws 33 and 34 of the clamping member 32. The fastener is moved to the first drill station 24 where a drill chuck 46 is moved axially in timed relation with the movement of the dial 22, which will be explained in greater detail as the description proceeds. Likewise, at the drill station 26 a drill chuck 48 is moved axially in timed relation with the dial 22 to finish drill the fastener. At the blow out station 28 a blast of air is directed onto the hole drilled in the fastener, to remove particles of the metal retained in the drilled hole.

The pellet insertion station 29 has a member, also radically movable with respect to the dial 22, for inserting friction material into the drilled hole in the fastener, after which, the fastener is removed from the clamp 32 at the ejector station 31.

Neither the feeder station 23 nor the insert station 28 will be described in greater detail as the operations performed at these stations comprise no part of the present invention. The movement of the various elements relative to the dial 22, which is accomplished by a common work head will however be later described. In like manner the drill stations 24 and 26 will be described in no greater detail with the exception of the common work head of the drills, insert plunger etc., mechanisms which will be elaborated on as the description proceeds.

The ejector station 31 and its operation are best shown in FIG. 4 wherein a pin 49 is biased by a spring 51 and is slidably movable through a bearing 52 provided in the turret 21. The pin 49 rides on a cam 53, and rotation of the cam is effective to move the pin upwardly between the surfaces 34a and 33a of the clamp 32 thereby knocking the fastener from the open jaws 34 and 36 of the clamp into a suitable receptacle (not shown). The fastener elements may be held with a screw head resting on the top surface of the jaws 33 and 34, or with the under surface resting on the plate 50 provided for that purpose.

For an understanding of the machine drive means, and the various operating elements thereof, reference should be had to FIGS. 5 through 8. In FIG. 5 there is shown the main drive motor 14 having a pair of sprockets 54 and 56 mounted on its drive shaft. The sprocket 54 is connected to a driven sprocket 57 by a chain 58 which passes around an idler sprocket 59. The driven sprocket 57 is disposed on a shaft 61 journaled in a portion of the frame 10. The function of the shaft 61 will be further elaborated on as the description proceeds.

The outer sprocket 56 is connected by a chain 62 passing around a pair of idler sprockets 63 and 64 to a driven sprocket 66 which is drivingly mounted on a shaft 67 journaled in the frame 10. The shaft 67 passes through the frame 10 and in turn drives a gear train comprising the mating gears 68, 69 and 71 (FIG. 7) to turn a shaft 72. The shaft 72 is located substantially parallel to the shaft 67 and is likewise journaled in the frame 10. The shaft 67 is provided with helical gears 73, 74, and the shaft 72 with helical gears 75 and 76 to drive the work heads of the subject machine in a manner to be explained in greater detail hereinafter.

As will also be noted in FIGS. 5 and 7, the shaft 67 has a cam element 77 keyed thereon for rotation with the shaft. Referring still to FIG. 5, an indexing clutch trip lever 78 is shown to be pivotally connected to the frame 10 through a pin 79 connected to an angle bracket 81. The lever 78 is biased downwardly by a spring 82 connected between the lever and the frame 10, and an arm 83 extends upwardly, having a roller 84 in contact with the cam 77.

Figure 6:
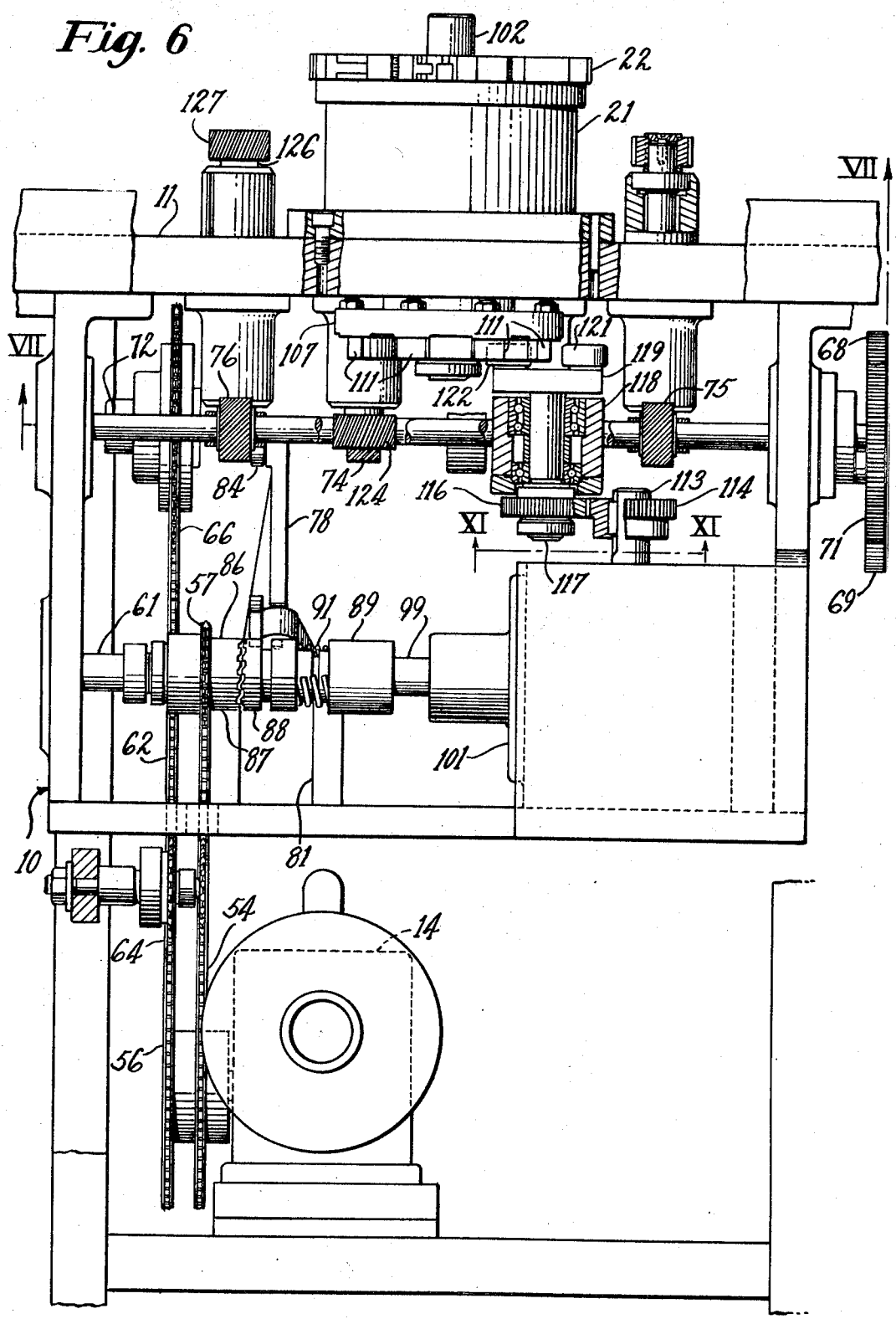
FIG. 6 is a side elevational view partially in section showing the drive mechanism of the machine in still greater detail.

Referring now to FIGS. 5 through 7 taken in conjunction with FIG. 8, there is shown an indexing clutch 86 on the shaft 61 comprising a gear toothed element 87 and a driven gear toothed element 88. The clutch element 88 is slidably retained on the shaft 99 and biased towards the clutch element 87 by a spring 91 which bears against a collar 89.

It will be noted from FIG. 8 that the driven element 88 is provided with a notch 92 and a partial peripheral groove 93 disposed in side by side relation. The lowermost portion of the lever 78 is provided with a pin 94 which when dropped into the groove 93 is effective to force the clutch element 88 against the spring 91 by virtue of the pin riding along a camming surface 95 of the groove, thereby to effect disengagement of the clutch element 88 from the element 87. In addition, a detent 96 is pivotally connected to the arm 78 by a pin 97, and is biased toward the clutch element 88 by a leaf spring 98. As is shown in FIG. 8, the detent 96 rides along the outer surface of the clutch element 88 to the position at which the pin 94 is effective to disengage the indexing clutch 86, at which position the detent drops into the notch 92 to positively lock the elements in position.

From the foregoing, it should be evident that each time the cam 77 (FIG. 5) is effective to move the roller 84 away from the shaft 67, the lever 88 rotates about the pin 79 to lift the detent 96 from the notch 92 and the pin 94 from the groove 93 to thereby provide engagement of the clutch elements 87 and 88. Engagement of the clutch 86 causes rotation of the housing 89 and a connecting shaft 99 through one revolution, at which time the pin 94 drops into the groove 93, disengaging the clutch, and the detent 96 drops into the notch 92 to lock the shaft 99 in its location.

The shaft 99 is connected to a right angle drive 101 which will be explained in detail hereinafter. The right angle drive 101 may be of any type well known in the art and may also include reduction gearing as needed.

As should also be evident from the above, neither the jamming of a work head or the dial means would be effective to alter the timing of the rotation of the shaft 99 with respect to the shafts 67 and 72. By providing the cam element 77 for operating the indexing clutch 86 through the lever 78, the mechanism returns to its proper indexing sequence whenever rotation of the cam is re-initiated after jamming.

Further, the cam element 77 may be so constructed as to cause two steps of rotation of the shaft 99 for each rotation of the cam bearing shaft 67, by merely changing the cam surface.

Referring now to FIGS. 4, 6 and 11 through 13 it will be observed that the means interconnecting the drive motor 14 with the dial 22 includes a shaft 102 which is keyed to the dial 22 for inducing rotary motion in the dial. The shaft 102 is supported in the turret 21 by a pair of bearings 103, 104 (FIG. 4) and has a flange 106 mounted on its lower end. A driving wheel 107 is attached to the flange 106 by a plurality of bolts 108.

Figure 11:
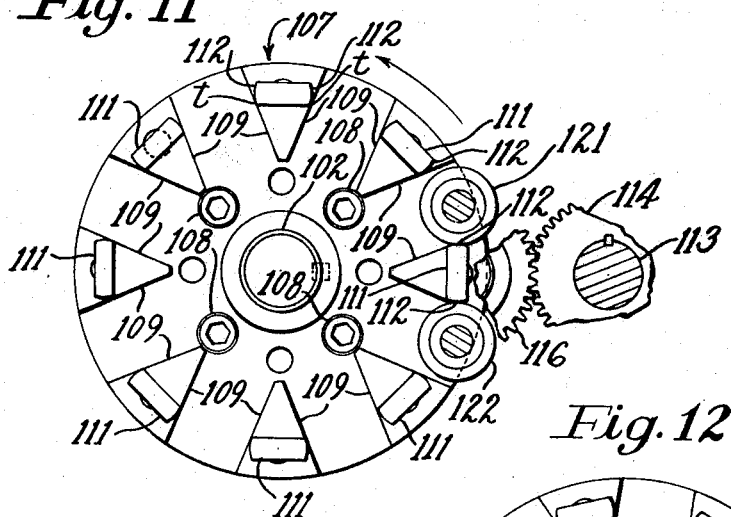
FIG. 11 is a sectional bottom plan view taken along the lines XI—XI of FIG. 6 showing details of the dial indexing mechanism of the machine, taken on an enlarged scale for clarity.

Referring particularly to FIG. 11, it will be noted that apparatus for providing intermittent motion to the dial member includes a plurality of slots milled in the wheel 107 forming eight wedge shaped elements 109 protruding from the lower surface of the wheel and having a pair of diverging surfaces. A bearing block 111 is disposed adjacent the outer edge of each of the driven elements 109, and is removably secured to the wheel 107 by a nut 110 secured to a threaded portion of the block extending through the wheel. Each of the bearing blocks 111 has a pair of radial surfaces 112 having a common center at the center of the bearing block. In other words, each of the bearing blocks 111 could be manufactured employing the mid portion of a cylinder.

The radial surfaces 112 of the blocks 111 are constructed so as to be tangential at the point $t$ with the diverging surfaces of the element 109. In addition, the elements 109 are each constructed such that the divergent surface of one is substantially parallel with the adjacent divergent surface of another.

Referring back to FIG. 6 the drive 101 has a vertical shaft 113 projecting therefrom with a gear 114 fixed thereto. The gear 114 meshes with a gear 116 attached to a shaft 117 journaled in a horizontally extending journal support 118 on the frame 10. At the upper extremity of the shaft 117 there is located a driving member in the form of a plate 119 having a pair of rollers 121 and 122 mounted for rotation thereon.

Figure 12:
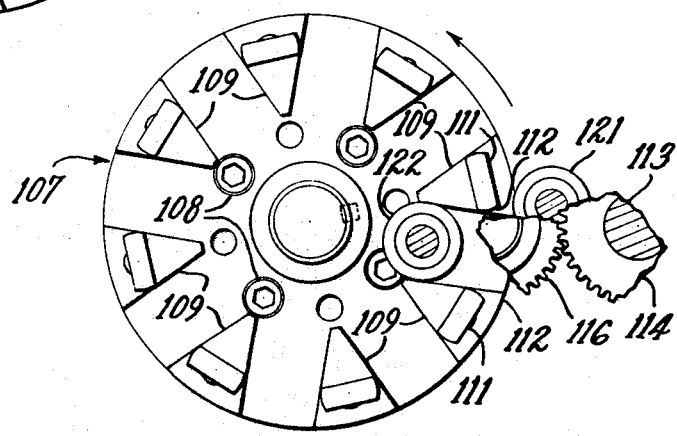
FIGS. 12 and 13 are sectional bottom plan views similar to FIG. 11 showing the relative positioning of the dial indexing mechanism during operation of the machine.
Figure 13:
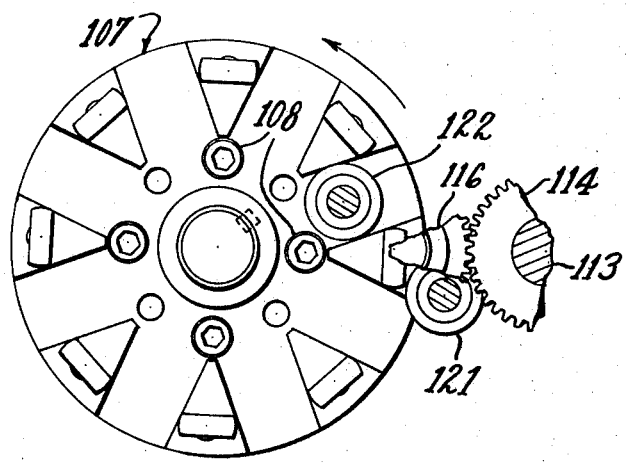

The center line spacing of the rollers 121 and 122 are such that they provide an interference fit with the curved surfaces 112 when disposed adjacent the bearing block 111 as shown in FIG. 11. Upon rotation of the gear 116, the drive plate 119 is rotated to the position shown in FIG. 12 thereby to move the dial 22 in the direction as shown by the arrows of FIGS. 11 through 13 the roller 122 applying a rolling pressure to the diverging surfaces of the element 109. Further rotation of the gear 116 causes the roller 122 to move radially outwardly between the element 109 while the roller 121 is rotating to enter a new slot between the adjacent elements 109. Further rotation of the drive plate 119 will cause the rollers 121 and 122 to be located in a position similar to that of FIG. 11 but for the roller 121 and the roller 122 having exchanged positions. In this position the wheel 107, and consequently the dial 22 is locked in position by the rollers 121 and 122. As should be evident from the above, 180° rotation of the gear 116, and consequently the drive plate 119, causes movement of the dial through 45°. As will also be evident from FIG. 11, any backlash in the gear train leading to gear 116, which would consequently permit rotation of the drive plate 119, does not substantially affect the locking of the bearing block 111 between the rollers 121 and 122. With 8 elements 109 as shown should the rollers 121 and 122 be moved through an angle of 45° or 22½° in either direction from the position shown in FIG. 11, they will ride along the curved surfaces 112 of the block and maintain locking of the block therebetween. Likewise, with the construction described, by maintaining the curved surfaces 112 tangential with the diverging surfaces of the equally spaced wedge shaped elements 109 and the diverging surfaces of each wedge shaped element parallel with the diverging surface of the adjacent element, the arc described by a curved surface 112 is equal to 360° divided by the number of elements. Therefore, the amount of rotation of the drive plate 119 which is ineffective to rotate the dial 22 is equal to 360° divided by the number of elements.

Figure 9:
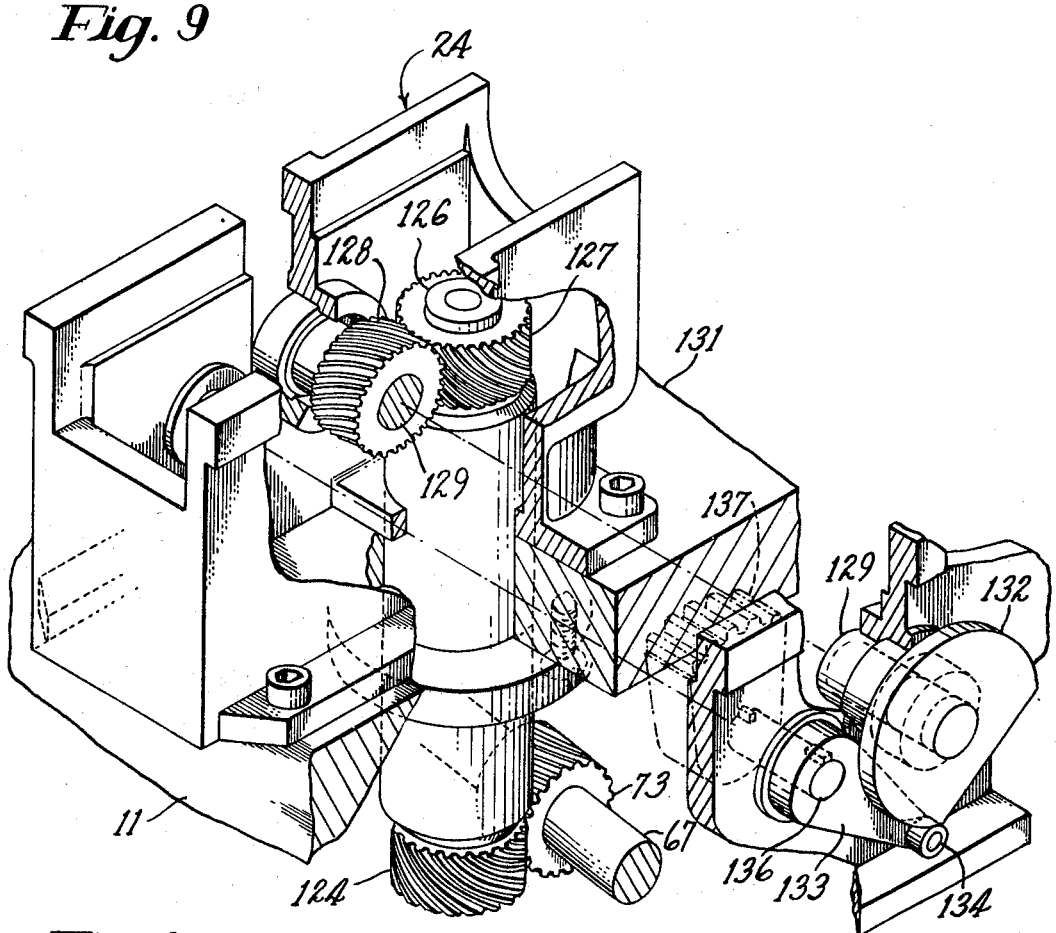
FIG. 9 is a fragmentary perspective view partially in section, showing details of a typical work head drive unit of the machine of FIG. 1, shown on an enlarged scale.
Figure 10:
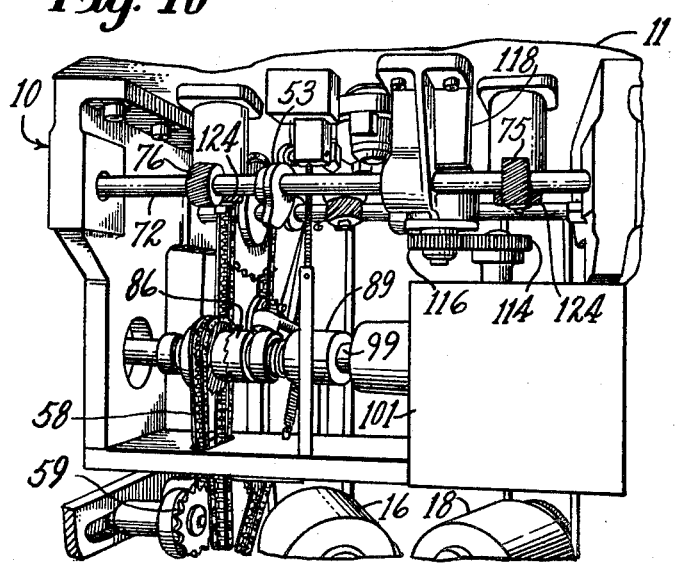
FIG. 10 is a perspective elevational side view showing details of the drive train of the machine of FIG. 1.

Reference should now be had to FIGS. 9 and 10 wherein there is shown a typical work station (as station 24) wherein an element such as a drill, milling cutter, or other device for performing a work step is moved toward and away from the dial 22 to perform work upon the fasteners rotated into and out of registry with the station. As previously described, the shaft 67 has a gear 73 mounted thereon which is turned continuously during operation of the main drive motor 14. A work head 125 is provided with a gear 124 on one end of a shaft 126, which gear is disposed in meshing engagement with the gear 73. A second gear 127 at the opposite end of the shaft 126 meshes with third gear 128 to provide an offset drive to a shaft 129 on which the gear 128 is mounted. Both the shaft 126 and the shaft 129 are journaled in a housing 131 which is mounted on the frame 10 at the station the particular operation is to be performed. At the end of the shaft 129 a cam 132 is keyed for rotation with the shaft, and an arm 133 is provided with a cam follower 134 biased toward the shaft 129. The arm 133 is further connected by a shaft 136 to a pinion 137, the shaft being journaled in the housing 131.

In operation, the rotation of the shaft 67 is effective to cause rotation of the shaft 129 through the gears 73, 124, 127 and 128. This rotation causes the cam 132 to move the cam follower 134 through a predetermined distance at a predetermined rate, as is adjustable by varying the shape of the cam 132 to be provided at any work station. It is evident that the pinion 137 can be connected to a drill, inserting plunger, milling cutter, or other work performing element to act on the fasteners which are brought into registration therewith by the dial 22.

In the disclosed embodiment, the stations 24 and 25 have drill chucks 46 and 48 movable by the pinion 137. The drill chucks 46 and 48 are rotated continuously by the auxiliary motors 16 and 18, and are moved intermittently with respect to the dial 22 by rotation of the cam 132.

It should here be brought to the reader's attention that the work head 125 may be employed at any of the stations 24, 26, 29 or 34, where there are openings provided in the table 11 adjacent the shafts 67 and 72. Each of the gears 73, 74, 75 and 76 mounted on the shafts having gear surfaces for meshing with the gear 124 on the post 126. In addition other gears having gear surfaces for meshing with the gear 124 are easily provided on the shafts 67 and 72 adjacent additional openings (not shown) in the table 11 for providing work steps such as punching, welding, spraying, etc.

From the foregoing therefore it will be evident that the invention provides a machine useful in the performance of secondary operations on threaded fasteners having inserts of friction material provided for locking purposes. The machine has overcome many of the objectionable features of devices known in the art in that it is versatile in handling fasteners of varying sizes, and is accurate for manufacture of fasteners of small diameter. By providing a positive locking means for the dial 22 which is also part of the means for rotating the dial, a simple structure is disclosed which is effective to accurately locate the fastener for operations such as drilling, milling and inserting of friction material therein.

In addition the performance of various operations may be changed from one location to another by providing a plurality of work heads which are operated directly from the shafts 67 and 72 and interchangeable from one station to another. The mechanical means for moving the work performing elements relative to the dial 22 provides a rapid means for adjustment in both distance and rate of movement toward and away from the dial. It is evident that by changing the cam 132 a rapid rate of movement for drilling one type of material can be replaced for a slower rate of movement for a second material by changing the cam angle. Also the drilling or, milling etc. operations may be changed from one depth to another to accommodate varying sizes of fasteners by merely changing the size of the cam 132.

While the preferred embodiment depicts apparatus wherein a plurality of workpieces are operated on by intermittent rotation of a dial member, it should further be understood that the dial is capable of constant rotation in employing the machine for spraying, marking or the like, or the dial may be stationary in an application wherein a plurality of operations are to be performed at various locations on a single workpiece.

Having thus described my invention, what I claim as new and desire to secure by Letters Patent of the United States is:

1. An automatic machine for performing a plurality of operations on a workpiece comprising: a frame having a table supported thereon, work support means disposed on said frame adjacent one surface of said table and movable with respect to said table, a plurality of shafts mounted on said frame in spaced relation with said work support and adjacent the opposite surface of said table from said work support, each of said shafts having a driving gear mounted thereon, a plurality of openings formed in said table one adjacent each of said driving gears, a work head positioned on said one surface of the table and having a post extending through one of said adjacent openings, a gear mounted on said post in driving engagement with said driving gear, drive means, means operatively connecting said drive means with at least one of said shafts, and disengageable means interconnecting said drive means with said work support means for imparting movement thereto, said means being disengageable in response to rotation of one of said shafts, said work head being readily removable from said position on the table and remountable thereon with its post extending through another of said adjacent openings in the table, and said driving gears each having a gear surface for meshing with said post gear, whereby said work head is interchangeably mountable in any one of said openings at a plurality of positions about said work support.

2. An automatic machine in accordance with claim 1 wherein said work support means comprises a dial member and said means interconnecting said drive means with said dial member is effective to impart rotation to said dial member.

3. An automatic machine in accordance with claim 1 wherein said work head also comprises cam means operatively connected with said post for initiating performance of a work step on a workpiece.

4. An automatic machine in accordance with claim 2 wherein said means interconnecting said drive means with said dial member is effective to impart intermittent rotation to said dial member.

5. An automatic machine in accordance with claim 4 wherein said interconnecting means comprises a disengageable clutch connecting said drive means with said dial member, a cam disposed on said one shaft for rotation thereby, and means disposed adjacent said cam for disengaging said clutch and re-engaging said clutch in response to rotation of said cam.

6. An automatic machine for use in the manufacture of self-locking fasteners or the like comprising a frame having a table supported thereon, a dial member disposed on said frame adjacent one surface of said table and having a plurality of clamping jaws movable from an open position to a clamping position in response to rotation of said dial member, a plurality of shafts mounted on said frame in spaced relation with said dial member and adjacent the opposite surface of said table from said dial member, each of said shafts having a driving gear mounted thereon, a plurality of openings formed in said table one adjacent each of said driving gears, a work head positioned on said one surface of the table and having a post extending through one of said adjacent openings, a gear mounted on said post and in driving engagement with said driving gear, drive means, means operatively connecting said drive means with at least one of said shafts, and disengageable means interconnecting said drive means with said dial member for imparting rotary motion thereto, said means being disengageable in response to rotation of one of said shafts, said work head being readily removable from said position on said table and remountable thereon with its post extending through another of said adjacent openings in said table, and said driving gears each having gear surfaces for meshing with said post gear, whereby said work head is readily movable to a plurality of positions about said dial member.

7. An automatic machine in accordance with claim 6 wherein said work head also comprises cam means operatively connected with said post for initiating performance of a work step on a work piece mounted in one of said clamping jaws.

8. An automatic machine in accordance with claim 6 wherein said means interconnecting said drive means with said dial member is effective to impart intermittent rotation to said dial member.

9. An automatic machine in accordance with claim 8 wherein said interconnecting means comprises a disengageable clutch connecting said drive means with said dial member, cam means disposed on said one shaft for rotation thereby, and means disposed adjacent said cam means for disengaging said clutch and re-engaging said clutch in response to rotation of said cam.

10. An automatic machine in accordance with claim 4 wherein said means interconnecting said drive means with said dial member further comprises a plurality of driven elements disposed on said dial member equally spaced from the dial axis of rotation and equally spaced one from another each of said elements having a pair of diverging surfaces and a pair of curved surfaces each tangential with one of said diverging surfaces, a rotatable driving member comprising a pair of roller each engageable sequentially with a curved surface and the associated diverging surface of one of said driven elements, said rollers being located with respect to said driven element surfaces such that movement of one of said rollers over one of said curved surfaces caused by rotation of said driving member is ineffective to cause rotation of said dial member, and movement of one of said rollers over one of said diverging surfaces caused by rotation of said drive member.

11. An automatic machine in accordance with claim 8 wherein said means interconnecting said drive means with said dial member further comprises a plurality of driven elements disposed on said dial member equally spaced from the dial axis of rotation and equally spaced one from another, each of said elements having a pair of diverging surfaces and a pair of curved surfaces each tangential with one of said diverging surfaces, a rotatable driving member comprising a pair of rollers each engageable sequentially with a curved surface and the associated diverging surface of one of said driven elements, said rollers being located with respect to said driven element surfaces such that movement of one of said rollers over one of said curved surfaces caused by rotation of said driving member is ineffective to cause rotation of said dial member, and movement of one of said rollers over one of said diverging surfaces caused by rotation of said drive member is effective to cause rotation of said dial member.

12. An automatic machine in accordance with claim 10 wherein said interconnecting means further comprises a disengageable clutch connecting said drive means with said dial member, cam means disposed on one of said shafts for rotation thereby, and means disposed adjacent said cam means for disengaging said clutch and re-engaging said clutch in response to rotation of said cam.

13. An automatic machine in accordance with claim 11 wherein said interconnecting means further comprises a disengageable clutch connecting said drive means with said dial member, cam means disposed on one of said shafts for rotation thereby, and means disposed adjacent said cam means in response to rotation of said cam.

14. Apparatus for providing intermittent motion to a workpiece comprising dial means rotatable about a central axis, a plurality of driven elements disposed on said dial means equally spaced from said dial axis and equally spaced one from another each of said elements comprising a wedge-shaped portion having its smaller dimension toward said dial axis and its larger dimension remote from said dial axis and a cylindrical portion having a pair of curved surfaces with a common center of curvature disposed adjacent the larger dimension of said wedge portion and having its curved surfaces tangential to the divergent surfaces of said wedge portion, a driving member having an axis of rotation, said drive member comprising a pair of rollers equally spaced from said drive member axis and each having a surface engageable sequentially with a respective curved surface and the associated diverging surface of one of said driven elements, said drive member axis being substantially in alignment with the common center of curvature of said curved surfaces, whereby rotation of said driving member is effective to cause one of said rollers to apply a rolling pressure against a driving surface of one of said driven elements while rotation of said driving member is ineffective to rotate said dial means while said rollers are in contact with the curved surfaces of a driven element.

References Cited

UNITED STATES PATENTS

| 2,025,268 | 12/1935 | Bullard | 29—38 |
| 1,833,329 | 11/1931 | Packer | 29—33 |
| 1,627,934 | 5/1927 | Stein | 29—33 |
| 2,120,877 | 6/1938 | Uber | 29—33 |
| 1,628,103 | 5/1927 | Best | 29—38 |
| 2,740,973 | 4/1956 | Borner et al. | 10—72 |
| 2,779,039 | 1/1957 | Borner | 10—72 |
| 3,185,468 | 5/1965 | Brightman | 10—10 |
| 3,310,821 | 3/1967 | Rehberg | 10—10 |
| 3,324,919 | 6/1967 | Brightman et al. | 10—10 |

CHARLES W. LANHAM, Primary Examiner

E. M. COMBS, Assistant Examiner

U.S. Cl. X.R.

10—10, 158, 169; 29—33, 38

PO-1050
(5/69)

UNITED STATES PATENT OFFICE
CERTIFICATE OF CORRECTION

Patent No. 3,492,681　　　　　　　　　　Dated February 3, 1970

Inventor(s)　Max Krueger

It is certified that error appears in the above-identified patent and that said Letters Patent are hereby corrected as shown below:

Column 8, claim 6, line 45, after "jaws" insert -- for receiving fasteners there-between, said jaws being--;
Column 9, claim 10, line 16, change "roller" to --rollers--;

Column 10, claim 13, line 5, after "means" insert -- for disengaging said clutch and re-engaging said clutch--.

SIGNED AND
SEALED
JUL 21 1970

(SEAL)
Attest:

Edward M. Fletcher, Jr.
Attesting Officer

WILLIAM E. SCHUYLER, JR.
Commissioner